United States Patent Office 3,109,015
Patented Oct. 29, 1963

3,109,015
XYLYLENE DITHIOCYANATES
Irving Rosen, Painesville, Ohio, assignor to Diamond Alkali Company, Cleveland, Ohio, a corporation of Delaware
No Drawing. Filed May 12, 1960, Ser. No. 28,517
6 Claims. (Cl. 260—454)

The present invention relates to novel thiocyano derivatives of nitro, haloalkyl and alkyl substituted benzenes and to their preparation and application.

This is a continuation-in-part of my co-pending application Ser. No. 776,708, filed November 28, 1958.

Compounds of this invention may be represented by the structure (I)

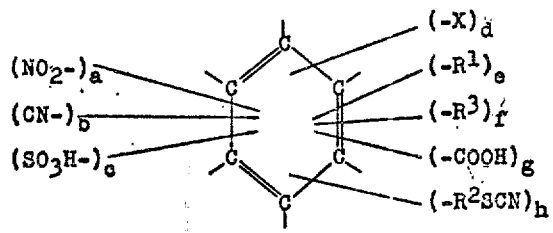

wherein $a, b, c, d, e, f$ and $g$ are numbers from 0 to 4, inclusive; $h$ is a number from 2 to 5, inclusive; X is halogen, i.e., chlorine, fluorine, bromine or iodine, chlorine being preferred; $R^1$ is an alkyl radical, e.g., methyl, ethyl, propyl, butyl, isopropyl, octyl and decyl radical, preferably a lower alkyl radical, i.e., a radical containing from 1 to 10 carbon atoms, inclusive; $R^2$ is an alkylene radical, e.g., methylene, ethylene, pentamethylene or propylene radical; $R^3$ is selected from the group consisting of hydroxyalkyl radicals, e.g., 2-hydroxyethyl, hydroxymethyl, hydroxypropyl and hydroxypentyl radicals, and haloalkyl radicals such as monochloromethyl, dichloromethyl, trichloromethyl, monochloroethyl, monobromomethyl, tribromomethyl, monochloroisopropyl and chlorobutyl, preferably chloro lower alkyl radicals; at least one of $a, b, c, d, e, f$ and $g$ being at least 1, the sum of $a, b, c, d, e, f, g$ and $h$ being less than 7; any free bonds being satisfied by hydrogen.

More specifically, illustrative compounds of this invention are bis(thiocyanomethyl) compounds which may be represented by the structure (II)

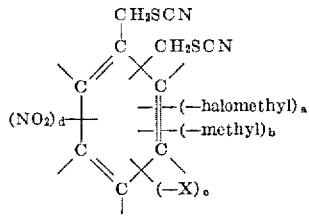

wherein $a, b, c$ and $d$ are numbers from 0 to 4, inclusive, their sum being less than 5, at least one of $a, b, c$ and $d$ being at least 1; X is halogen, any free bonds being satisfied by hydrogen.

The term "halomethyl", as employed in structure II in the specification and in the claims, is intended to refer to a methyl radical having from 1 to 3 halogen atoms substituted in place of the hydrogen atoms. Specific examples of halomethyl radicals, as intended by this definition, are monochloromethyl, dichloromethyl, trichloromethyl, monochloromonobromomethyl, monobromomethyl, dibromoethyl and monoiodomethyl.

Generally, compounds of this invention, i.e., the compounds within the scope of generic structure I above, may be prepared by chemically reacting a haloalkylbenzene having haloalkyl, hydroxyalkyl, halo, nitro, cyano, sulfonic (—SO₃H), carboxylic (—COOH) or alkyl radicals substituted on the ring with a metal thiocyanate, i.e., compounds within the scope of generic structure I may be prepared by chemically reacting a compound of the structure (III)

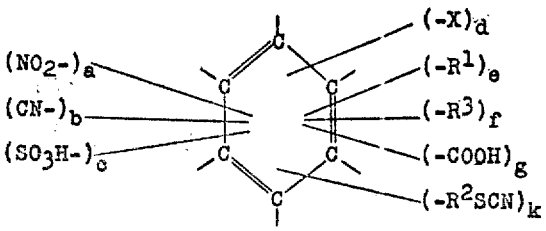

wherein $a, b, c, d, e, f, g$, X $R^1$, $R^2$ and $R^3$ are as defined under structure I; $k$ is a number from 0 to 4; at least 1 of $a, b, c, d, e, f$ and $g$ is at least 1, the sum of $a, b, c, d, e, f, g$ and $k$ being less than 7; any free bonds being satisfied by hydrogen, with a metal thiocyanate represented by the structure (IV)          M—SCN wherein M is a metal atom, preferably an alkali metal, i.e., sodium, potassium, lithium, rubidium or cesium; or alkaline earth metal atom, i.e., barium, strontium or calcium, and ammonia radicals. This reaction is ordinarily carried out in the presence of a solvent such as a ketone, e.g., methylethyl ketone, acetone, methylisobutyl ketone, and alcohols, e.g., ethanol, isopropanol, cyclohexanol, or the like. The reaction temperature generally is between about 30° and 300° C., such as 40°–150° C., preferably at the reflux temperature of the solvent employed, i.e., at about 80° C. when employing methylethyl ketone. The reaction time typically is about ¼ to 8 hours, e.g., 1 to 5 hours. The reactants are combined in a mole ratio of about 1 mole of the aryl compound, i.e., the compound represented by structure III, to about 1 to 6 moles of the metal thiocyanate of structure IV, and at least sufficient of the above-mentioned solvents to dissolve the reactants. Exemplary of these ratios is the ratio of 1 mole of the aryl compound to 1 to 6 moles of sodium, potassium or ammonium thiocyanate and 3 to 20 moles of methylethyl ketone. Purification of the resultant solid is carried out typically by recrystallization from an organic solvent, such as an alcohol, e.g., methanol, ethanol, isopropanol, butanol, alcohol-water mixtures, such as 50% ethanol-water mixture, and hydrocarbons, e.g., xylene and toluene. The resultant thiocyanate is typically a yellow or yellow-orange solid, melting above about 40° C.

Although recrystallization is the presently-preferred method of isolating the solids of this invention, they may also be isolated through distillation, preferably at reduced pressure. These solids are ordinarily less than 5% soluble in water and greater than 5% soluble in acetone, cyclohexanone and xylene.

More specifically, compounds within the scope of generic structure II above may be prepared by chemically reacting a compound of the structure (V)

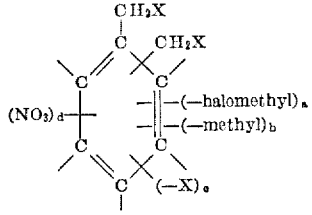

with a metal thiocyanate of structure IV, wherein $a, b, c, d$ and X are as previously defined under structure II, at least one of *a*, *b*, *c* and *d* is at least 1, any free bonds being satisfied by hydrogen; the sum of *a*, *b*, *c* and *d* is less than 5. The preferred thiocyanate reactants are sodium, potassium or ammonium thiocyanate which are reacted under essentially the same reaction conditions as those disclosed in the preparation of a compound within the scope of generic structure I.

Table I enumerates specific illustrative compounds of this invention and the reactants employed in preparing these compounds; column 1 lists the substituted alkaryl compound within the scope of generic structure III; column 2 lists the thiocyanate compounds within the scope of generic structure IV, and the compounds of column 3 are the products resulting from the chemical reaction of the reactants given in columns 1 and 2. These reactions may be carried out under essentially the same reaction conditions previously given in the reaction of generic compounds III and IV.

with other known biologically-active materials, such as other pesticides, insecticides, foliage and soil fungicides, pre- and post-emergent herbicides, fertilizers, and the like.

Thus, it will be appreciated that compounds of this invention may be employed to form biologically-active substances containing such compounds as essential active ingredients thereof, which compositions may also include finely-divided dry or liquid diluents, extenders, fillers, conditioners, including various clays, diatomaceous earth, talc, spent catalyst, alumina-silica materials, liquids, solvents, diluents, or the like, including water and various organic liquids, such as benzene, toluene, chlorinated benzene, acetone, cyclohexanone, alcohols, petroleum distillate fractions, and various mixtures thereof.

When liquid formulations are employed or dry materials prepared which are to be used in liquid form, it is desirable in certain instances additionally to employ a

TABLE I

| Substituted Alkaryl Compounds of Structure (III) | Thiocyanate Compounds of Structure (IV) | Aryl Thiocyanate Reaction Products of Structure (I) |
|---|---|---|
| 2-chloro-p-xylylene dichloride | Sodium thiocyanate | 2-chloro-p-xylylene dithiocyanate. |
| 2-bromo-p-xylylene dichloride | Potassium thiocyanate | 2-bromo-p-xylylene dithiocyanate. |
| 2-iodo-p-xylylene dichloride | do | 2-iodo-p-xylylene dithiocyanate. |
| 2-chloromethyl-p-xylylene dichloride | Ammonium thiocyanate | 2-chloromethyl-p-xylylene dithiocyanate. |
| 2, 5-dichloro-p-xylylene dichloride | Lithium thiocyanate | 2, 5-dichloro-p-xylylene dithiocyanate. |
| 2',5-dibromo-p-xylylene dibromide | Sodium thiocyanate | 2, 5-dibromo-p-xylylene dithiocyanate. |
| a, a'-dichlorodurene | Lithium thiocyanate | a, a'-dithiocyanodurene. |
| 2, 3, 5-trichloro-p-xylylene dichloride | Sodium thiocyanate | 2, 3, 5-trichloro-p-xylylene dithiocyanate. |
| 2, 3, 5, 6-tetrachloro-p-xylylene dichloride | Potassium thiocyanate | 2, 3, 5, 6-tetrachloro-p-xylylene dithiocyanate. |
| 2, 3, 5, 6-tetramethyl-p-xylylene dichloride | Calcium thiocyanate | 2, 3, 5, 6-tetramethyl-p-xylylene dithiocyanate. |
| 4-chloro-2, 5-bis (chloromethyl)-toluene | do | 4-chloro-2, 5-bis (thiocyanomethyl)-toluene. |
| 3, 6-dichloro-2, 5-bis (chloroethyl)-p-xylene | Ammonium thiocyanate | 3, 6-dichloro-2, 5-bis (thiocyanoethyl)-p-xylene. |
| 3, 6-dibromo-2, 5-bis (chloroethyl)-p-xylene | Sodium thiocyanate | 3, 6-dibromo-2, 5-bis (thiocyanoethyl)-p-xylene. |
| 2, 3, 5-trichloro-p-xylylene dibromide | Ammonium thiocyanate | 2, 3, 5-trichloro-p-xylylene dithiocyanate. |
| 2-nitro-p-xylylene dichloride | do | 2-nitro-p-xylylene dithiocyanate. |
| 2-bromo-p-xylylene dibromide | do | 2-bromo-p-xylylene dithiocyanate. |
| 1, 4-bis (chloromethyl)-2-methylbenzene | do | 2-methyl-p-xylylene dithiocyanate. |
| 2, 5-dichloro-3-nitro-p-xylylene dichloride | do | 2, 5-dichloro-3-nitro-p-xylylene dithiocyanate. |
| 2-chloro-3, 5-dinitro-p-xylylene dichloride | do | 2-chloro-3, 5-dinitro-p-xylylene dithiocyanate. |
| 3, 6-dichloro-2, 5-bis (bromomethyl)-toluene | Lithium thiocyanate | 3, 6-dichloro-2, 5-bis (thiocyanomethyl)-toluene. |
| 4-chloro-m-xylylene dichloride | Sodium thiocyanate | 4-chloro-m-xylylene dithiocyanate. |
| 4-bromo-m-xylylene dichloride | Lithium thiocyanate | 4-bromo-m-xylylene dithiocyanate. |
| 4-iodo-m-xylylene dichloride | Ammonium thiocyanate | 4-iodo-m-xylylene dithiocyanate. |
| 4, 6-dichloro-m-xylylene dichloride | Sodium thiocyanate | 4, 6-dichloro-m-xylylene dithiocyanate. |
| 2, 4, 6-trichloro-m-xylylene dichloride | Potassium thiocyanate | 2, 4, 6-trichloro-m-xylylene dithiocyanate. |
| 2-chloro-m-xylylene dibromide | Lithium thiocyanate | 2-chloro-m-xylylene dithiocyanate. |
| 4-chloro-o-xylylene dibromide | Ammonium thiocyanate | 4-chloro-o-xylylene dithiocyanate. |
| 4, 6-dichloro-m-xylylene dichloride | Sodium thiocyanate | 4, 6-dichloro-m-xylylene dithiocyanate. |
| 3, 4, 6-trichloro-o-xylylene dichloride | Potassium thiocyanate | 3, 4, 6-trichloro-o-xylylene dithiocyanate. |

It will be understood that any compound in column 1 may be reacted with any compound of column 2 forming other products within the scope of this invention.

Also intended are compounds having the structure —RCH$_2$SCN substituted on a benzene ring, wherein R is an alkylene group, and methods of preparing these compounds, illustrative examples of which are given in Table II in which column 1 enumerates the substituted aryl compound, column 2 lists the respective thiocyanate reactants and column 3 enumerates the desired product. The reactants may be mixed under essentially the same reaction conditions given previously.

wetting, emulsifying, dispersing or other surface active agent to facilitate use of the formulation, e.g., Triton X–155 (alkyl aryl polyether alcohol, U.S. Patent No. 2,504,064), cationic quaternary ammonium salts, alkyl aryl sulfonates, and the like.

The term "carrier" as employed in the specification and claims is intended to refer broadly to the materials constituting a major proportion of a biologically-active material or other formulation and hence includes finely-divided materials, both liquids and solids, as aforementioned, generally used in such applications.

In order that those skilled in the art may more com-

TABLE II

| Substituted Aryl Reactant | Thiocyanate Reactant | Thiocyano Reaction Product |
|---|---|---|
| 2-chloro-1,4-bis(2-chloroethyl)benzene | Lithium thiocyanate | 2-chloro-1,4-bis(2-thiocyanoethyl)benzene. |
| 5-chloro-1,3-bis(1-bromopropyl)benzene | Sodium thiocyanate | 5-chloro-1,3-bis(1-thiocyanopropyl)benzene. |
| 1,4-dichloro-2 (1-chloroethyl)5-(chloromethyl) benzene | Potassium thiocyanate | 1,4-dichloro-2(1-thiocyanoethyl)-5-(thiocyanomethyl) benzene. |
| 4-chloro-5(1-bromoethyl)2-(bromomethyl) toluene. | Calcium thiocyanate | 4-chloro-5(1-thiocyanoethyl)-2-(thiocyanomethyl) toluene. |

It will be understood, of course, that the compounds within the scope of generic structure I, especially those within the scope of generic structure II, may be utilized in diverse formulations, both liquid and solid, including finely-divided powders and granular materials, as well as liquids, such as solutions, concentrates, emulsifiable concentrates, slurries, and the like, depending upon the application intended and the formulation media desired.

These compounds may be used alone or in combination pletely understand the present invention and the preferred methods by which the same may be carried into effect, the following specific examples are offered:

*Example 1*

PREPARATION OF 2-CHLORO-p-XYLYLENE DITHIOCYANATE

In a reactor, equipped with thermometer, reflux condenser and agitation means, are placed a solution of 28.4 g. of sodium thiocyanate (0.352 mol) in 175 ml. of methylethyl ketone and 31.0 g. (0.148 mol) of 2-chloro-p-xylene dichloride. The reactants are refluxed for a period of about 3½ hours. The reactant mixture is then poured into about 1 liter of water, the solid which separates being filtered, washed with water and dried, followed by recrystallization from isopropanol, yielding about 30 g. of the desired $C_{10}H_7S_2N_2Cl$, melting at 108°–109° C. This desired product is further indicated by the following elemental analytical data:

| Element | Actual Percent by Weight | Calculated Percent by Weight |
| --- | --- | --- |
| C | 47.3 | 47.2 |
| H | 2.7 | 2.8 |
| S | 24.8 | 25.1 |

*Example 2*

PREPARATION OF 1,2,4,5-TETRAMETHYL-3,6-BIS(THIO-CYANOMETHYL) BENZENE

Into a reactor, equipped with stirrer, reflux condenser and heating means, are placed 30.0 g. (0.13 mol) of bis(chloromethyl)durene, 25.0 g. (0.31 mol) of sodium thiocyanate and 500 ml. of methylethyl ketone. The reaction mixture is stirred and heated at reflux for 4 hours with additional methylethyl ketone being added in order to maintain a thin slurry. The resultant reaction product is poured into an excess of water, followed by filtering the product and recrystallizing it from xylene. The resultant solid material, $C_{14}H_{16}S_2N_2$, melts at 199°–201° C. and is indicated by the following elemental analytical data:

| Element | Actual Percent by Weight | Calculated Percent by Weight |
| --- | --- | --- |
| C | 61.6 | 60.8 |
| H | 6.1 | 5.8 |

*Example 3*

PREPARATION OF 2,3,5,6-TETRACHLORO-p-XYLYLENE DITHIOCYANATE 35.0 g. (0.112 mol) of 1,4-bis(chloromethyl)tetrachlorobenzene and 21.4 g. (0.264 mol) of sodium thiocyanate in 600 ml. of methylethyl ketone are placed in a reactor equipped with thermometer, reflux condenser and agitation means. The mixture is refluxed with stirring for about 3 hours, followed by pouring the resultant mixture into a slight excess of water to obtain the desired solid product, $C_{10}H_4S_2N_2Cl_4$, melting at 264°–267° C. and indicated by the following elemental analytical data:

| Element | Actual Percent by Weight | Calculated Percent by Weight |
| --- | --- | --- |
| C | 33.7 | 33.5 |
| H | 1.3 | 1.1 |

*Example 4*

PREPARATION OF 2,5-DICHLORO-p-XYLYLENE DITHIOCYANATE 33.8 g. (0.138 mol) of 2,5-dichloro-p-xylylene dichloride, 26.4 g. (0.326 mol) of sodium thiocyanate and 500 ml. of methylethyl ketone are mixed in a reactor equipped with reflux condenser, thermometer and agitation means. The mixture is heated at reflux for a period of about 3 hours, followed by pouring the reaction product into a slight excess of water. The resulting precipitate is recrystallized from toluene, yielding the desired $C_{10}H_6S_2N_2Cl_2$, melting at 202°–203° C. as indicated by the following elemental analytical data:

| Element | Actual Percent by Weight | Calculated Percent by Weight |
| --- | --- | --- |
| S | 22.1 | 22.2 |
| N | 9.6 | 9.7 |

*Example 5*

PREPARATION OF 4-CHLORO-m-XYLYLENE DITHIOCYANATE 59.7 g. (0.2 mol) of 4-chloro-m-xylylene dibromide, 20.0 g. (0.263 mol) of ammonium thiocyanate and 500 ml of methylethyl ketone are mixed in a reactor equipped with reflux condenser, agitation means and thermometer. The reaction mixture is refluxed for a period of about 1 hour, at the end of which period an additional 20 g. of ammonium thiocyanate is added. The mixture is then refluxed for an additional hour, followed by pouring the resultant solid into a slight excess of water. The desired $C_{10}H_7S_2N_2Cl$, which precipitates and is recrystallized from ethanol, yields a product melting at 72°–74° C. and is indicated by the following elemental analytical data:

| Element | Actual Percent by Weight | Calculated Percent by Weight |
| --- | --- | --- |
| C | 47.2 | 47.3 |
| H | 3.0 | 2.8 |

*Example 6*

PREPARATION OF 2-CHLOROBENZYL THIOCYANATE 40.3 g. (0.25 mol) of 2-chlorobenzyl chloride, 20.0 g. (0.262 mol) of ammonium thiocyanate and 150 ml. of methylethyl ketone are mixed together in a reactor equipped with reflux condenser, agitation means and thermometer. The mixture is refluxed for a period of about 2 hours with the addition of a small amount of additional methylethyl ketone. The resulting mixture is allowed to cool and poured into an excess of water, yielding an oil which, after washing with water and drying, is distilled at 109°–110° C. at 0.6 mm. mercury pressure, yielding the desired $C_8H_6SNCl$, indicated by the following elemental analytical data:

| Element | Actual Percent by Weight | Calculated Percent by Weight |
| --- | --- | --- |
| C | 53.1 | 52.3 |
| H | 3.4 | 3.3 |

*Example 7*

PREPARATION OF 2,6-DICHLOROBENZYL THIOCYANATE 47.9 g. (0.20 mol) of 2,6-dichlorobenzyl bromide, 20.0 g. (0.26 mol) of ammonium thiocyanate and 400 ml. of methylethyl ketone are mixed and heated to reflux in a reactor equipped with reflux condenser, thermometer and agitation means. The mixture is refluxed for about 1½ hours, followed by pouring the resultant product into an excess of water. The precipitate resulting is distilled at reduced pressure, yielding the desired $C_8H_5SNCl_2$, boiling at 120° C. at 0.5 mm. mercury pressure and indicated by the following elemental analytical data:

| Element | Actual Percent by Weight | Calculated Percent by Weight |
| --- | --- | --- |
| C | 43.9 | 44.0 |
| H | 2.3 | 2.3 |

Example 8

PREPARATION OF 2,4-DICHLOROBENZYL THIOCYANATE 19.0 g. (0.25 mol) of ammonium thiocyanate and 50 ml. of methylethyl ketone are mixed in a reactor equipped with thermometer, reflux condenser and agitation means. This mixture is heated to reflux, followed by the addition of 39.1 g. (0.20 mol) of 2,4-dichlorobenzyl chloride dissolved in 50 ml. of methylethyl ketone. Refluxing is continued for about 1½ hours, followed by pouring the resultant product, upon cooling, into an excess of water. The solid which precipitates is recrystallized from a 50% ethanol-water mixture, yielding the desired $C_8H_5SNCL_2$ melting at 56°–57° C. and indicated by the following elemental analytical data:

| Element | Actual Percent by Weight | Calculated Percent by Weight |
|---|---|---|
| C | 44.4 | 44.1 |
| H | 2.5 | 2.3 |

Example 9

PREPARATION OF a,a'-DITHIOCYANO-2,3,5-TRICHLORO-p-XYLENE

A solution of a,a'-dibromo-2,3,5-trichloro-p-xylene (36.7 g., 0.1 mol) in acetone (100 ml.) is added (1–3 minutes) to a refluxing solution of ammonium thiocyanate (17 g., 0.224 mol) in 200 ml. of acetone. The mixture is refluxed an additional 5 minutes, allowed to cool and poured into 2 liters of water. After filtration and drying, the crude solid is recrystallized from boiling toluene (1 liter) with the aid of decolorizing carbon to give 26 g. (73%) of $C_{10}H_5Cl_3N_2S_2$, melting at 198.5°–199° C. as indicated by the following elemental analytical data:

| Element | Actual Percent by Weight | Calculated Percent by Weight |
|---|---|---|
| C | 37.4 | 37.11 |
| H | 1.7 | 1.56 |
| Cl | 32.9 | 32.87 |

Example 10

PREPARATION OF a,a'-DICHLORO-2-NITRO-p-XYLENE 40 g. of p-xylene dichloride is added slowly with constant stirring to 300 ml. of fuming nitric acid at room temperature, taking precaution not to allow the reaction temperature to rise above 40° C. Upon reaction completion, the mixture is poured into a larger volume of water, stirred for one hour, and cooled to precipitate the product which is filtered, washed and dried, yielding the desired $C_8H_7Cl_2NO_2$, as indicated by the following elemental analytical data:

| Element | Actual Percent by Weight | Calculated Percent by Weight |
|---|---|---|
| Cl | 32.2 | 32.1 |
| N | 6.33 | 6.36 |

Example 11

PREPARATION OF a,a'-DITHIOCYANO-2-NITRO-p-XYLENE

A solution of a,a'-dichloro-2-nitro-p-xylene (10 g., 0.045 mol) in 100 ml. of acetone is added (3–5 minutes) to a stirred-gently refluxing solution of ammonium thiocyanate (8 g., 0.105 mol) in 100 ml. of acetone. The resulting solution is refluxed another 10–15 minutes, during which time a white solid forms. After cooling to room temperature, the mixture is poured into one liter of cold water. After filtration and drying, the crude solid is recrystallized twice from isopropyl alcohol (220 ml.) with the aid of decolorizing carbon to give 5.4 g. (45%) of pale yellow solid, $C_{10}H_7N_3O_2S_2$, melting at 121°–122° C., as indicated by the following elemental analytical data:

| Element | Actual Percent by Weight | Calculated Percent by Weight |
|---|---|---|
| C | 45.3 | 45.27 |
| H | 2.8 | 2.66 |
| N | 17.4 | 15.84 |
| S | 24.3 | 24.17 |

Example 12

PREPARATION OF 2-BROMO-a,a'-DITHIOCYANO-p-XYLENE

To a stirred-gently refluxing solution of ammonium thiocyanate (20 g., 0.26 mol) in 100 ml. of acetone is added over a one-hour period a solution of a,a',2-tribromo-p-xylene (27 g., 0.08 mol) in 200 ml. of acetone. After refluxing an additional hour, the mixture is cooled to room temperature and poured into one liter of cold water. The resulting solid is filtered off, dried and recrystallized from isopropyl alcohol to give 22.5 g. (75%) of $C_{10}H_7BrN_2S_2$, melting at 117°–118° C., as indicated by the following elemental analytical data:

| Element | Actual Percent by Weight | Calculated Percent by Weight |
|---|---|---|
| C | 40.4 | 40.12 |
| H | 2.4 | 2.36 |

Example 13

PREPARATION OF a'-(THIOCYANO)-4-CHLORO-m-XYLENE

A solution of 4-chloro-3-methylbenzyl bromide (33 g., 0.15 mol) in 50 ml. of acetone is added over a 30-minute period to a stirred refluxing solution of ammonium thiocyanate (15.2 g., 0.2 mol) in 70 ml. of acetone. The stirred mixture is then refluxed an additional hour, cooled, poured into one liter of cold water and the red oil separated. After the oil has dried over Drierite, an infrared examination of the sample reveals the presence of a sharp thiocyanate band. Distillation of the crude oil give 18.4 g (62%) of $C_9H_8ClNS$, boiling at 128°–132° C. at 1.5 mm. Hg, as indicated by the following elemental analytical data:

| Element | Actual Percent by Weight | Calculated Percent by Weight |
|---|---|---|
| C | 54.5 | 54.7 |
| H | 3.6 | 4.1 |

The infrared spectrum shows a strong band for thiocyanate and a very weak band for isothiocyanate, indicating that this compound is subject to some thermal isomerization.

Example 14

PART A: PREPARATION OF 1,4-BIS(CHLOROMETHYL)-2-METHYLBENZENE BY CHLOROMETHYLATION OF a-CHLORO-m-XYLENE

A stirred mixture of a-chloro-m-xylene (I) (141 g., 1.0 mol), 40% formaldehyde solution (100 g., 1.3 mol), zinc chloride (10 g.) and concentrated hydrochloric acid (500 g.) is maintained at 60°–70° C. for 5.5 hours while anhydrous HCl is passed through the mixture. After cooling, the upper organic phase is separated, washed with two 100 ml. portions of water, two 100 ml. portions of 5% sodium carbonate solution and finally with two 100 ml. portions of water again. After drying over Drierite, the ether is removed and the residue is distilled at 1 mm. Hg to give 114.5 g. (81%) of recovered I. Chilling the 25.5 g. residue gives after filtration, 8 g. of solid which, after several recrystallizations from hexane, weighs 2.5 g.

and melts at 58.5°–59° C., as indicated by the following elemental analytical data:

| Element | Actual Percent by Weight | Calculated Percent by Weight |
| --- | --- | --- |
| C | 56.5 | 57.17 |
| H | 5.3 | 5.33 |

These results are in reasonable agreement for bis(chloromethyl) methylbenzene.

PART B: PREPARATION OF 1,4-BIS(CHLOROMETHYL)-2-METHYLBENZENE BY CHLORINATION OF PSEUDOCUMENE

A solution of pseudocumene (240 g., 2.0 mol) in 750 ml. of carbon tetrachloride is treated (under the influence of ultraviolet light) at 35°–40° C. with 300 g. (4.2 mol) of chlorine over an 8-hour period. The carbon tetrachloride is removed and the residue is distilled at reduced pressure to give a forerun (145 g.), boiling at 76°–125° C. at 8 mm. Hg, a cut (65 g.) boiling at 124°–130° C. at 8 mm. Hg, which solidifies upon chilling and a residue of 168 g. which does not solidify upon cooling. The solid from the 65 g. cut is removed by filtration and recrystallized from hexane to give 13 g. (3.4%) of material having a constant melting point of 58.5°–59° C. This does not depress the melting point of the similar melting solid from the chloromethylation of a-chloro-m-xylene in concentrated hydrochloric acid and whose elemental analysis is in good agreement for the novel 1,4-bis(chloromethyl)-2-methylbenzene.

*Example 15*

PREPARATION OF 1,4-BIS(THIOCYANO)METHYL-2-METHYLBENZENE

A stirred solution of ammonium thiocyanate (17.2 g., 0.2 mol) in 100 ml. of acetone is heated to reflux and a solution of 1,4-bis(chloromethyl)-2-methylbenzene (9.5 g., 0.05 mol) in 100 ml. of acetone is added over a 10-minute period. After refluxing an additional hour, the mixture is cooled and poured into 2 liters of cold water. The resulting solid is filtered off, dried and recrystallized from 145 ml. of isopropyl alcohol with the aid of decolorizing carbon to give 9.1 g. of $C_{11}H_{10}N_2S_2$, melting at 118°–119.5° C. A second recrystallization of a small portion gives an analytical sample melting at 120.5°–121° C. Elemental analysis is as follows:

| Element | Actual Percent by Weight | Calculated Percent by Weight |
| --- | --- | --- |
| C | 57.3 | 56.4 |
| H | 4.2 | 4.3 |

*Example 16*

PREPARATION OF a,a',2,5-TETRACHLORO-3-NITRO-p-XYLENE

A suspension of a,a',2,5-tetrachloro-p-xylene (I) (12.2 g., 0.05 mol) in a mixture of 90% $HNO_3$ (25 ml.) and 96% $H_2SO_4$ (40 ml.) is heated on a water bath at 85°–90° C. with stirring for 20 minutes. I melts and remains as an insoluble oil during this period of heating. After cooling, the reaction mixture is poured over 1 kg. of crushed ice. The solid which precipitates is collected by filtration and recrystallized twice from methanol, yielding 7.5 g. (52%) of pure a,a',2,5-tetrachloro-3-nitro-p-xylene, melting at 94°–95.5° C. A second crop weighing 2.5 g. (18%) and melting at 87°–91° C. is isolated by concentrating the combined filtrates. The elemental analysis indicates that the compound has the formula $C_8H_5Cl_4NO_2$.

| Element | Actual Percent by Weight | Calculated Percent by Weight |
| --- | --- | --- |
| C | 32.9 | 33.25 |
| H | 1.7 | 1.74 |
| Cl | 48.7 | 49.08 |
| N | 4.5; 4.7 | 4.85 |

*Example 17*

PREPARATION OF 2,5-DICHLORO-3-NITRO-a,a'-DI(THIOCYANO)-p-XYLENE

A solution of a,a',2,5-tetrachloro-3-nitro-p-xylene (9.8 g., 0.034 mol) and $NH_4SCN$ (6.6 g., 0.086 mol) in acetone (100 ml.) is refluxed with stirring for one-half hour. During this period the red solution gradually becomes yellow, and a precipitate of $NH_4Cl$ forms. After cooling, the reaction mixture is poured into water and the precipitate collected by filtration. The dried product is recrystallized twice from benzene to yield 7.8 g. (69%) of 2,5-dichloro-3-nitro-a,a'-di(thiocyano)-p-xylene, melting at 186°–187° C. Analytical results indicate that the compound has the formula $C_{10}H_5Cl_2N_3O_2S_2$.

| Element | Actual Percent by Weight | Calculated Percent by Weight |
| --- | --- | --- |
| C | 35.9; 36.2 | 35.94 |
| H | 1.6; 1.6 | 1.51 |
| S | 19.9; 19.9 | 19.19 |

*Example 18*

PREPARATION OF a,a',2-TRICHLORO-3,5-DINITRO-p-XYLENE

Solid a,a',2-trichloro-p-xylene (52.4 g., 0.25 mol) is added in one portion to a stirred mixture of 90% $HNO_3$ (125 ml.) and 96% $H_2SO_4$ (200 ml.) at 95° C. An exothermic reaction occurs at once, the temperature of the reaction mixture rising rapidly to 108° C., then falling slowly to 93° C. in 10 minutes. After cooling to 20° C., the reaction mixture is poured slowly over crushed ice. The crude product is isolated by filtration and recrystallized three times from methanol to yield 18.7 g. (25%) of a,a',2-trichloro-3,5-dinitro-p-xylene melting at 78°–79° C. Analytical results indicate that the compound has the formula $C_8H_5Cl_3N_2O_4$.

| Element | Actual Percent by Weight | Calculated Percent by Weight |
| --- | --- | --- |
| C | 32.2; 32.5 | 32.08 |
| H | 1.9; 1.6 | 1.68 |

*Example 19*

PREPARATION OF 2-CHLORO-3,5-DINITRO-a,a'-DI(THIOCYANO)-p-XYLENE

A solution of a,a',2-trichloro-3,5-dinitro-p-xylene (21.5 g., 0.072 mol) and $NH_4SCN$ (19 g., 0.25 mol) in acetone (250 ml.) is refluxed with stirring for 45 minutes, during which time a precipitate of $NH_4Cl$ separates. After cooling, the reaction mixture is poured into 2 liters of water. The solid which separates is collected by filtration and dried. Recrystallization from an acetone-benzene mixture gives 13.9 g. (56%) of 2-chloro-3,5-dinitro-a,a'-di(thiocyano)-p-xylene, melting at 171°–172° C. The analytical results indicate that the compound has the formula $C_{10}H_5ClN_4O_4S_2$.

| Element | Actual Percent by Weight | Calculated Percent by Weight |
| --- | --- | --- |
| C | 34.9 | 34.84 |
| H | 1.4 | 1.46 |
| S | 18.4; 18.7 | 18.56 |

*Example 20*

To test phytotoxic effects, tomato plants, variety Bonny

Best, 5 to 7 inches tall; bean, variety Tendergreen, just as the trifoliate leaves are beginning to unfold; corn, variety Cornell M-1 (field corn), 4 to 6 inches tall; and oats, variety Clinton, 4 to 5 inches tall, are sprayed with an aqueous test formulation (0.48% test chemical-12.5% cyclohexanone-0.05% Triton X-155-balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure, results are tabulated in Table III.

TABLE III.—PHYTOTOXICITY TEST RESULTS

| Compound Tested | Plants Tested [1] | | | |
| --- | --- | --- | --- | --- |
| | Tomato | Bean | Corn | Oats |
| 2-chloro-p-xylenedithio-cyanate—Product of Example 1 | 0 | 0 | 0 | 0 |
| 1,2,4,5-tetramethyl-3,6-bis(thiocyanomethyl) benzene—Product of Example 2 | 0 | 0 | 0 | 0 |
| 2,3,5,6-tetrachloro-p-xylylene dithiocyanate—Product of Example 3 | 0 | 0 | 0 | 0 |
| 2,5-dichloro-p-xylylene dithiocyanate—Product of Example 4 | 0 | 0 | 0 | 0 |
| 4-chloro-m-xylylene dithiocyanate—Product of Example 5 | 1 | 0 | 0 | 0 |
| 2-chlorobenzyl thiocyanate—Product of Example 6 | 11 | 4 | 2 | 1 |
| 2,6-dichlorobenzyl thiocyanate—Product of Example 7 | 11 | 2 | 3 | 2 |
| 2,4-dichlorobenzyl thiocyanate—Product of Example 8 | 2 | 1 | 5 | 3 |
| 2,3,5-trichloro-p-xylylene dithiocyanate—Product of Example 9 (0.24% of test chemical) | 0 | 0 | 1 | 0 |
| 2-nitro-p-xylylene dithiocyanate—Product of Example 11 (0.24% of test chemical) | 0 | 0 | 0 | 0 |
| 2-bromo-p-xylylene dithiocyanate—Product of Example 12 | 0 | 0 | 0 | 0 |
| 3-methyl-4-chlorobenzyl thiocyanate—Product of Example 13 | 6 | 10 | 2 | 2 |
| 2-methyl-p-xylylene dithiocyanate—Product of Example 15 | 0 | 0 | 0 | 0 |
| 2,5-dichloro-3-nitro-p-xylylene dithiocyanate—Product of Example 17 | 0 | 0 | 0 | 0 |
| 2-chloro-3,5-dinitro-p-xylylene dithiocyanate—Product of Example 19 | 0 | 0 | 0 | 0 |

[1] Phytotoxicity rating according to procedure given in Example 20.

*Example 21*

In order to compare the fungicidal activity of the compounds of this invention, a tomato foliage disease test is run measuring the ability of the various test compounds to protect tomato foliage against the early blight fungus, *Alternaria solani*, and the late blight fungus, *Phytophthora infestans*. The method employs tomato plants 5 to 7 inches high of the variety Bonny Best. Duplicate plants, one set for each test fungus, are sprayed with 100 ml. of a test formulation at a toxicant concentration of 4 to 400 p.p.m. (concentration test chemical-5% acetone-0.01% Triton X-155-balance water) using 40 lbs. air pressure while the plants are rotated on a turntable in a spray chamber. After the spray deposit is dry, the treated plants, and comparable untreated controls, are sprayed with a spore suspension containing approximately 20,000 conidia of *A. solani* per ml. and 150,000 sporangia of *P. infestans* per ml., respectively. The atomizer used delivers 20 ml. in 30 seconds.

The thus-inoculated plants are held in a 100% humid atmosphere for 24 hours at between 60° and 70° F. to permit spore germination and infection before removal to a greenhouse. After 2 to 4 days, lesion counts are made on the three uppermost fully-expanded leaves. Employing this procedure, the $ED_{95}$ values, i.e., the concentration which causes greater than 95% disease control, are determined on the various compounds enumerated in Table IV. Columns 1, 2 and 3 enumerate the compound tested, the $ED_{95}$ value employing the early blight fungus, and the $ED_{95}$ value employing the late blight fungus, respectively.

TABLE IV

| Compound Tested | $ED_{95}$ E. Blight, p.p.m. | $ED_{95}$ L. Blight, p.p.m. |
| --- | --- | --- |
| 2-chloro-p-xylylene dithiocyanate—Product of Example 1 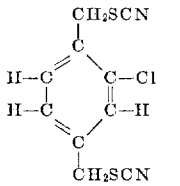 | <4 | <50 |
| 1,2,4,5-tetramethyl-3,6-bis(thiocyanomethyl) benzene—Product of Example 2 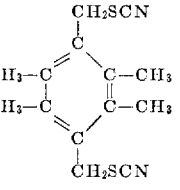 | >400 | >400 |
| 2,3,5,6-tetrachloro-p-xylylene dithiocyanate—Product of Example 3 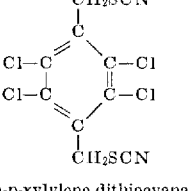 | >400 | >400 |
| 2,5-dichloro-p-xylylene dithiocyanate—Product of Example 4 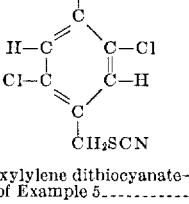 | >400 | >400 |
| 4-chloro-m-xylylene dithiocyanate—Product of Example 5 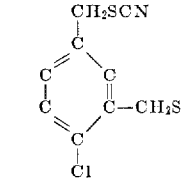 | >400 | >400 |
| 2-nitro-p-xylylene dithiocyanate—Product of Example 11 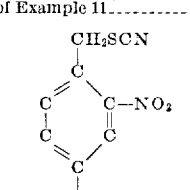 | <400 | >400 |
| 2-bromo-p-xylylene dithiocyanate—Product of Example 12 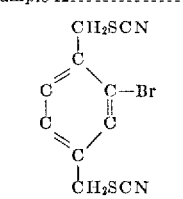 | >400 | >400 |

| Compound Tested | ED$_{95}$ E. Blight, p.p.m. | ED$_{95}$ L. Blight, p.p.m. |
|---|---|---|
| 2-methyl-p-xylylene dithiocyanate— Product of Example 15 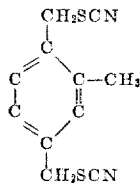 | <400 | >400 |

*Example 22*

In bactericide testing the chemicals are formulated at 1250 p.p.m. as follows:

(a) 0.1 g. test compound
(b) 5 ml. of acetone
(c) 2 ml. stock emulsifier solution (0.50% Triton X-155 in water)
(d) 73 ml. distilled water, The concentration of the formulation constituents are not maintained; i.e., the emulsifier and acetone are diluted, e.g., by a factor of five. The concentration of the toxicant is thus diluted to 250 p.p.m. Test chemicals are examined for ability to inhibit the growth of four species of bacteria (*Erwinia amylovora, Xanthomonas phaseoli, Micrococcus pyrogenes* var. *aureus, Escherichia coli*). The cultures used for testing are sub-cultured for two sequential 24-hour periods to insure uniform test population. Bacterial test suspensions are made in distilled water in the agar slant culture tube by gentle shaking. The suspension is then filtered through a double layer of cheesecloth and adjusted to standard concentration by turbimetric measurement. The bacterial suspensions are then added to 5 ml. of the test formulation in what is designated as the medication tubes and set aside at room temperature for 4 hour. After the exposure period transfers are made by means of a standard 4 mm. platinum loop to 7 ml. of sterile broth. The broth tubes are then incubated for 48 hours at 29° C., at which time bacterial growth is determined by turbimetric measurement. A reading is recorded for each test tube after shaking. Three replicates of each organism serve as controls. Comparative growth calculations are made on the percent of the mean check reading. This value, subtracted from 100, gives percent control as compared to checks.

TABLE V

| Compound Tested | E. amylovora | X. phaseoli | S. aureus | E. coli |
|---|---|---|---|---|
| 2-chloro-p-xylylene dithiocyanate | 0 | 39 | 0 | 0 |
| 1,2,4,5-tetramethyl-3,6-bis (thiocyanomethyl) benzene | 19 | 26 | 0 | 0 |
| 2,5-dichloro-p-xylylene dithiocyanate | 0 | 0 | 0 | 80 |
| 4-chloro-m-xylylene dithiocyanate | 4 | 0 | 43 | 0 |
| 2,3,5-trichloro-p-xylylene dithiocyanate | 0 | 21 | 14 | 0 |
| 2-nitro-p-xylylene dithiocyanate | 0 | 100 | 14 | 0 |
| 2-bromo-p-xylylene dithiocyanate | 0 | 0 | 0 | 22 |
| 2-methyl-p-xylylene dithiocyanate | 11 | 0 | 61 | 6 |
| 2,5-dichloro-3-nitro-p-xylylene dithiocyanate | 76 | 32 | 0 | 44 |
| 2-chloro-3,5-dinitro-p-xylylene dithiocyanate | 0 | 0 | 31 | 0 |
| p-xylylene dithiocyanate | 0 | 0 | 0 | 0 |

*Example 23*

This test measures the ability of test compounds to protect tomato foliage against infection by the early blight fungus *Alternaria solani* (Ell. and Mart.) Jones and Giant, and the late blight fungus *Phytophthora infestans* (Mont.) De Bary. The test method is essentially that described by McCallan, S. E. A., and R. H. Wellman, "A Greenhouse Method of Evaluating Fungicides by Means of Tomato Foliage Disease," Contribs. Boyce Thompson Institute 13(3): 93–134, July-September 1943. Bonny Best tomato plants, 5 to 7 inches high, are sprayed with 100 ml. of the test formulation at 40 p.s.i. while being rotated on a turntable in a spray hood.

After the spray deposit is dry, treated plants and comparable untreated controls (sprayed with a formulation less toxicant) are sprayed with a spore suspension of one of the test fungi. The plants are then placed in a saturated atmosphere for 24 hours at 70° F. for early blight and 60° F. for late blight so spore germination and infection will occur. After 2 to 4 days lesion counts are made on the three uppermost fully-expanded leaves. The data are converted to percent disease control based on the number of lesions obtained in the check plants.

TABLE VI

| Compound Tested | Percent disease control at p.p.m. | | | |
|---|---|---|---|---|
| | 512 | 256 | 128 | 64 |
| 2-nitro-p-xylylene dithiocyanate: | | | | |
| E. Blight | 93 | 87 | 71 | 67 |
| L. Blight | 69 | 55 | 7 | 13 |
| 2-methyl-p-xylylene dithiocyanate: | | | | |
| E. Blight | 85 | 78 | 72 | 2 |
| L. Blight | 28 | 50 | 0 | 0 |

*Example 24*

The large seed leaves of 10-day-old pinto bean plants are exposed to uredospores of the bean rust fungus, *Uromyces phaseoli*. The plants are sprayed with a test formulation (0.2% of the product of Example 11-5% acetone-0.01% Triton X-155-balance water) 24 hours after they have been exposed to the fungus. The bean plants are then placed in a water-saturated atmosphere for 24 hours at 70° F. After incubation the plants are removed to controlled greenhouse conditions and 9 to 10 days after treatment rust lesions are counted. The data observed are converted to percent disease control based on the number of lesions obtained on the control plants. At a concentration of 512 p.p.m., the product of Example 11 shows 58% rust control.

*Example 25*

In testing the systemic action of the product of Example 12 against bean rust incited by *Uromyces phaseoli*, 10-day-old pinto bean plants, 3 plants per 4-inch pot, serve as the test unit. At this age the seed leaves are expanded but the trifoliates are not developed. The large seed leaves are used for the test.

The test chemical is applied to the soil in the standard formulation, i.e., a final concentration of 2000 p.p.m. chemical, 4% acetone and 0.01% Triton X-155. The amount of chemical applied is calculated on a surface area basis. Treatment is accomplished by drenching 56 ml. of the formulation on the soil. Dosage rate is regulated by the concentration of the chemical in the test preparation so the volume applied remains the same.

Immediately following application of the chemical to the soil, the plants are sprayed with a spore suspension of the rust fungus, *Uromyces phaseoli*. This is prepared by taking 30 mg. of freshly-harvested spores and mixing with 48 mg. of talc. This is then diluted with water at the rate of about 1 mg. of the talc-spore mixture to 1.7 ml. of distilled water.

15

After spraying the spores on the seed leaves of the bean plants, they are placed in a saturated atmosphere for 24 hours at 60° F. After incubation the plants are removed to the greenhouse.

Rust lesions can be counted 9 to 10 days after exposure. The data are converted to percent disease control based on the number of lesions obtained on the control plants. At a concentration of 128 lbs./acre the chemical exhibits 92% control.

Example 26

The following test measures the ability of 2-bromo-p-xylylene dithiocyanate to protect pea seed and seedlings from decay. In this test infested soil in 4 x 4 x 3-inch plant band boxes is treated by a soil drench-mix method at the equivalent rate of 128 lbs./acre. Treatment is accomplished by pouring 70 ml. of a 2000 p.p.m. test formulation (2000 p.p.m. test chemical-5% acetone-0.01% Triton X-155) on the surface of the soil. This is allowed to stand until the next day when the soil is removed from each box and thoroughly mixed before being replaced in the box. Three days after treatment, 25 pea seeds, variety Perfection, are planted to a uniform depth per box. Untreated checks and standardized material are included in each test in addition to a check planted in sterilized soil. Percentage stand recorded 14 days after planting shows 84% for 2-bromo-p-xylylene dithiocyanate.

Example 27

This test measures the ability of 2-bromo-p-xylylene dithiocyanate to prevent deterioration of cotton duck in soil known to be infested with cellulose-decomposing organisms. Duplicate strips of 8 oz. cotton duck, 1″ x 6″, with the long dimension parallel to the warp, are treated by dipping them into a 1% solution of the test compound dissolved in acetone or another suitable soluble volatile. Each strip is dipped in solution for 10 seconds, then allowed to drain until dripping stops. They are then placed on a paper towel until dry and then planted vertically in a wooden box, 12″ x 12″ x 8″ deep, containing soil infested with cellulose-destroying fungi. Standard reference chemicals such as G-4 and checks are also included in the test box which is then incubated at 80° F. for two weeks. At the end of the exposure period, the test specimens are removed from the soilbed, and if not completely degraded, are gently washed to remove soil, dried, and breaking strength determinations made on a tensilometer. Strips treated by immersion in a 1.0% solution of 2-bromo-p-xylylene dithiocyanate have a tensile strength of 29 fourteen days after exposure, while a buried control has a tensile strength of 0.

Example 28

To detect root absorption and translocation, an aqueous test formulation (2000 p.p.m. test chemical-5% acetone-0.01% Triton X-155-balance water) is drenched on the soil in clay pots containing test plants at various rates (102 mg./pot and 51 mg./pot, or approximately equivalent to 128 lbs./acre and 64 lbs./acre, respectively). The test species are one tomato plant, variety Bonny Best, 5 to 7 inches tall, growing in a 4-inch pot, and four Tendergreen bean plants on which the trifoliate leaves have not emerged from the bud, growing in a 3½-inch pot. Plants are held under controlled greenhouse conditions for two weeks before examination after which phytotoxicity ratings, based on a scale from 0 for no injury to 11 for plant kill, and other responses are determined. At 128 lbs./acre the products of Examples 7 and 13 cause severe stunting of both tomato and bean plants. At this concentration the product of Example 13 also causes stem collapse of both the tomato and bean plants. At 64 lbs./acre the product of Example 13 causes severe stunting and stem collapse of the bean plants only.

Phytotoxicity ratings for the chemicals tested are set forth in Table VII:

TABLE VII

| Chemical | Concentration, lbs./acre | Phytotoxicity Tomato | Phytotoxicity Bean |
|---|---|---|---|
| 2-chloro-p-xylylene dithiocyanate | 128 | 0 | 0 |
| 1,2,4,5-tetramethyl-3,6-bis(thiocyanomethyl) benzene | 128 | 0 | 0 |
| 2,3,5,6-tetrachloro-p-xylylene dithiocyanate | 128 | 0 | 0 |
| 2,5-dichloro-p-xylylene dithiocyanate | 128 | 0 | 0 |
| 2-chlorobenzyl thiocyanate | 128 | 0 | 11 |
|  | 64 | 10 | 10 |
| 2,6-dichlorobenzyl thiocyanate | 128 | 1 | 0 |
| 4-chloro-m-xylylene dithiocyanate | 128 | 0 | 0 |
| 2,3,5-trichloro-p-xylylene dithiocyanate | 128 | 0 | 0 |
| 2-nitro-p-xylylene dithiocyanate | 128 | 0 | 0 |
| 2-bromo-p-xylylene dithiocyanate | 128 | 0 | 0 |
| 5-methyl-4-chlorobenzyl thiocyanate | 128 | 1 | 1 |
|  | 64 | 0 | 1 |
| 2-methyl-p-xylylene dithiocyanate | 128 | 0 | 0 |
| 2,5-dichloro-3-nitro-p-xylylene dithiocyanate | 128 | 0 | 0 |
| 2-chloro-3,5-dinitro-p-xylylene dithiocyanate | 128 | 0 | 0 |

It is to be understood that although the invention has been described with specific reference to particular embodiments thereof, it is not to be so limited, since changes and alterations therein may be made which are within the full intended scope of this invention as defined by the appended claims.

What is claimed is:
1. Compounds of the structure

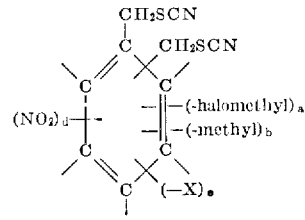

wherein $a$, $b$, $c$ and $d$ are numbers from 0 to 4, inclusive; their sum being less than 5; at least one of $a$, $b$, $c$ and $d$ being at least 1; X is selected from the group consisting of chlorine, bromine, iodine and fluorine; any free bonds being satisfied by hydrogen.
2. 2-chloro-p-xylylene dithiocyanate.
3. 4-chloro-m-xylylene dithiocyanate.
4. 2-nitro-p-xylylene dithiocyanate.
5. 2-bromo-p-xylylene dithiocyanate.
6. 2-methyl-p-xylylene dithiocyanate.

References Cited in the file of this patent
UNITED STATES PATENTS

| | | |
|---|---|---|
| 1,841,458 | Taube et al. | Jan. 19, 1932 |
| 2,024,098 | Heckert | Dec. 10, 1935 |
| 2,462,433 | Searle | Feb. 22, 1949 |
| 2,642,353 | Mowry et al. | June 16, 1953 |
| 2,908,705 | Nischk | Oct. 13, 1959 |
| 2,911,336 | Urbschat | Nov. 3, 1959 |
| 2,939,875 | Floria | June 7, 1960 |
| 2,943,016 | Rosen et al. | June 28, 1960 |
| 2,943,106 | McKay | June 28, 1960 |
| 2,965,537 | Rosen | Dec. 20, 1960 |

FOREIGN PATENTS

| | | |
|---|---|---|
| 919,290 | Germany | Oct. 18, 1954 |

OTHER REFERENCES

Degering: Outline of Organic Nitrogen Compounds, pp. 543, 546 (1945) (copy in Library).

Strzelecka: Chemical Abstracts 5, 884 (1911) (copy in Library).

UNITED STATES PATENT OFFICE
CERTIFICATE OF CORRECTION

Patent No. 3,109,015                                    October 29, 1963

Irving Rosen

It is hereby certified that error appears in the above numbered patent requiring correction and that the said Letters Patent should read as corrected below.

Column 2, lines 62 to 70, formula V should appear as shown below instead of as in the patent:

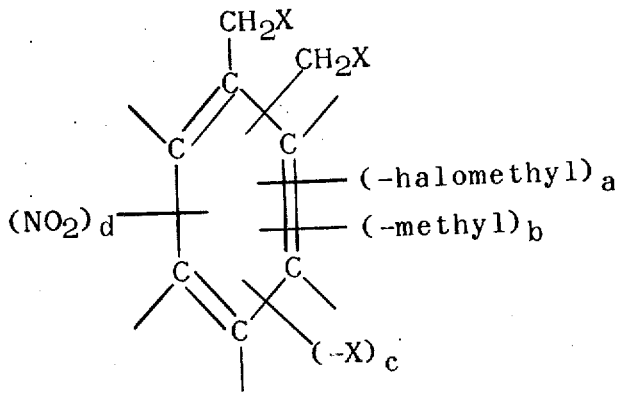

Signed and sealed this 12th day of May 1964.

(SEAL)
Attest:

ERNEST W. SWIDER
Attesting Officer

EDWARD J. BRENNER
Commissioner of Patents